Sept. 12, 1933.                    A. ESAU                    1,926,617
                ARRANGEMENT FOR PRODUCING ULTRASHORT WAVES
                           Filed April 30, 1930

Inventor:
Abraham Esau
by
Attorney

Patented Sept. 12, 1933

1,926,617

UNITED STATES PATENT OFFICE 1,926,617

ARRANGEMENT FOR PRODUCING ULTRA-SHORT WAVES

Abraham Esau, Jena, Germany

Application April 30, 1930, Serial No. 448,675, and in Germany July 25, 1929

3 Claims. (Cl. 250—36)

The present invention relates to an arrangement for the generation of ultra-short waves by means of a four-electrode tube mounted in braking field connection, which possesses a superior efficiency over the known arrangements of that type. It is known, that high vibrations can be produced in a tube by the connection of a high positive voltage with an electrode, situated between an electrode of slight negative voltage and the filament, and these oscillations may be accounted for in that within the space between the electrodes there will occur a pendulum motion of the electrons.

In comparison with the known arrangements using three electrode tubes, an increased efficiency is obtained by using a tube having four electrodes and, according to this invention, by supplying an oscillatory circuit between one grid and the anode and a second oscillatory circuit between the two grids. The useful circuit can then be connected to the oscillatory circuits.

The four electrode tube possesses, besides the heating wire or filament H, two grids $G_1$ and $G_2$ and the anode A. To the grid $G_1$ is connected a high positive voltage (+80) through the intermediary of the choking coil $Dr$. The grid $G_2$, however, is on the low negative potential (—8), while the anode A in the tests carried out up to the present, is under slight positive pressure. The halves of the receiving dipoles $Di$ are electrically connected with the anode or the grid $G_1$ respectively, being under high positive pressure. Between the points of connection of the halves of the dipoles and the grid $G_2$ are introduced the condensers $C_1$ and $C_2$. In consequence by this arrangement, there will be formed two oscillatory circuits one between the anode and the grid $G_2$ and the other between the two grids $G_1$ and $G_2$ respectively.

Figure 2:
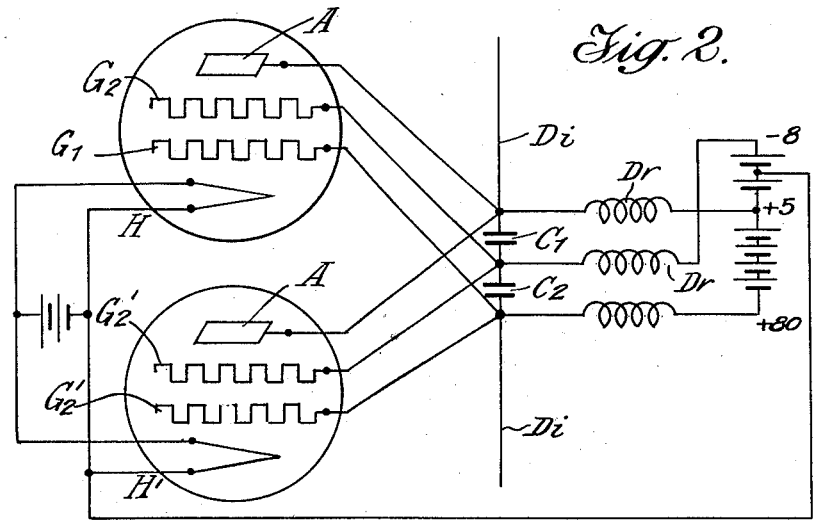
Figure 2 is a similar view showing a second form thereof wherein two tubes are used.
Figure 1:
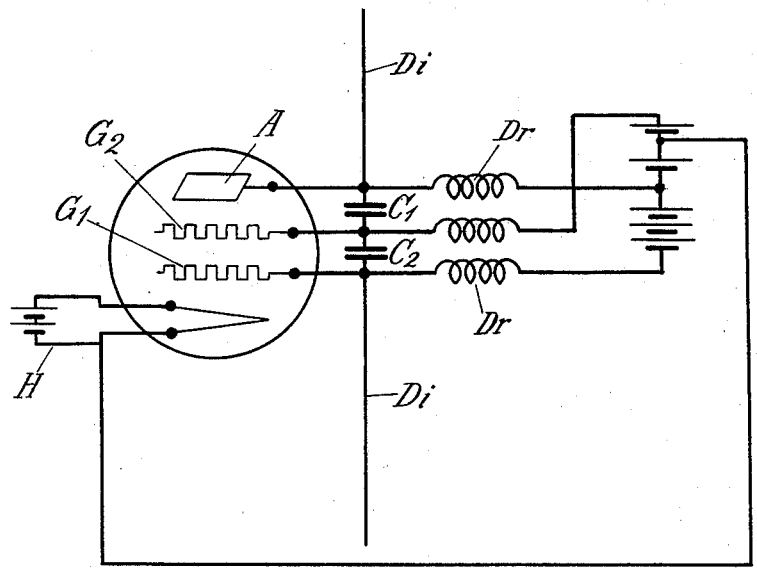
Figure 1 is a diagrammatic view showing one form of the invention.

The connection shown will function more advantageously if two tubes are operated in parallel, for it has been found that by the cooperation of two tubes $R_1$ and $R_2$ otherwise connected symmetrically, the efficiency is not only increased twofold as compared with the connection shown in Fig. 1, but even fivefold. It is obvious that this arrangement can also be used if more than two tubes are caused to operate in cooperation.

I claim:

1. Apparatus for generating ultrashort radio waves including a four element tube having a filament, a plate and a pair of grids, a source of electric energy having end poles and an intermediate pole, a wire connecting one end pole with one of said grids, a second wire connecting the remaining end pole with the other grid, a wire connecting the intermediate pole with the plate, a pair of dipoles connected respectively to the first and third wires, a pair of condensers one of which is bridged across the first and second wires and the other of which is bridged across the second and third wires, and a further wire connecting the filament to the source of electric energy between the connection of the first and third wires to said source.

2. Apparatus for generating ultrashort radio waves including a four element tube having a filament, a plate and a pair of grids, a source of electric energy having end poles and an intermediate pole, a wire connecting one end pole with one of said grids, a second wire connecting the remaining end pole with the other grid, a wire connecting the intermediate pole with the plate, a pair of dipoles connected respectively to the first and third wires, a pair of condensers one of which is bridged across the first and second wires and the other of which is bridged across the second and third wires, a filament battery having its terminals conductively connected to the respective terminals of the filament, said source of energy having a second intermediate pole, and a conductive connection between said second intermediate pole and one terminal of the filament.

3. Apparatus for generating ultra-short radio waves including a four element tube, the four elements of said tube including an anode and a pair of grids, said apparatus further including two oscillation circuits, comprising three conductors directly connected at one end to the plate and the two grids respectively and condensers joining the other ends of said conductors.

ABRAHAM ESAU.